United States Patent [19] [11] 3,783,724
Uhlig [45] Jan. 8, 1974

[54] PLASTIC BOTTLE MANUFACTURE
[75] Inventor: Albert R. Uhlig, Toledo, Ohio
[73] Assignee: Owens-Illinois Inc., Toledo, Ohio
[22] Filed: Nov. 7, 1972
[21] Appl. No.: 304,547

Related U.S. Application Data
[62] Division of Ser. No. 103,660, Jan. 4, 1971.

[52] U.S. Cl. .................... 83/140, 83/914, 425/808
[51] Int. Cl. ............................................. B26d 3/00
[58] Field of Search .................... 83/143, 140, 914; 264/161; 425/808

[56] References Cited
UNITED STATES PATENTS
3,465,931 9/1969 Rupert ............................ 83/914 X
2,772,735 12/1956 Wakelee ........................... 83/188 X Primary Examiner—J. M. Meister
Attorney—David R. Birchall and Edward J. Holler

[57] ABSTRACT

A blow molding apparatus for forming containers from organic plastic material wherein the container is formed with an expanded radially extending wall at the finish of the container so that the flash and moile material can be removed by a die cut or blanking operation of the apparatus.

5 Claims, 19 Drawing Figures

PLASTIC BOTTLE MANUFACTURE

This is a division of application Ser. No. 103,660 filed 1/4/71.

This invention relates generally to an apparatus for blow molding plastic articles and more particularly the invention relates to the formation of the top portion of an article such as a container so that the unwanted flash material may be severed from the container while the container remains in the mold.

Heretofore it has been customary to produce containers by the blow molding process and after the container has been formed to final configuration, it is removed from the mold and the unwanted flash material as well as the moile section is severed from the container. The subsequent removal of the unwanted material from the container presents problems in that chips may be lodged in the container during the final machining of the finish area. Particularly in blow molding containers from plastic materials there is waste material around the finish or neck portion of the container that must be ultimately removed. As the excess material is trimmed from the container there is the possibility that the trimmings may fall into the container through the opening or openings in the container. It is quite common for static electricity to be generated any time a plastic article is manipulated; because of this the trimmings from the flash and moile removal adhere to the inside as well as the outside walls of the container and consequently are hard to remove.

It is also well-known that once the plastic container is removed from the confinement of the mold, it is difficult to grasp or hold it in any precise manner because of its light weight and flexibility. Therefore, it is difficult to make a neck opening that is circular within sufficiently close tolerances to receive and to hold a closure firmly enough to provide a tight seal at all locations around the periphery of the closure. It has been common practice to ream the opening to make it circular, this practice has the disadvantage in that the opening so produced is often not concentric so that the wall of the container about the opening does not have a uniform thickness, but has thin areas where breakage can occur.

Thus in accordance with the above, it is the primary object of the present invention to provide an apparatus for severing the unwanted plastic material from the top section of the container while the container is in the mold.

Another object of this invention is to provide a plastic container in which there is a reduced tendency for flash material to enter the container as a result of trimming operations.

A further object of this invention is to remove the moile and additional unwanted plastic material from the container while the plastic material is in a thermal state less susceptible to cracking.

An additional object of the instant invention is to remove the unwanted material from the finish area of a container in a plurality of pieces.

Another object of this invention is to provide an apparatus that will remove the unwanted plastic material in concentric fashion from the flash area of a container.

Further objects, features and advantages of the present invention will become apparent from a consideration of the following description which shows the preferred embodiments in the accompanying drawings in which:

As heretofore mentioned, the present invention sets forth apparatus and also a method for creating a finished container. The container can be trimmed in one operation after it has been removed from the blow mold; also selected embodiments of the present invention show how the trimming operation can be achieved while the container is in the confinement of the blow mold.

Figure 1:
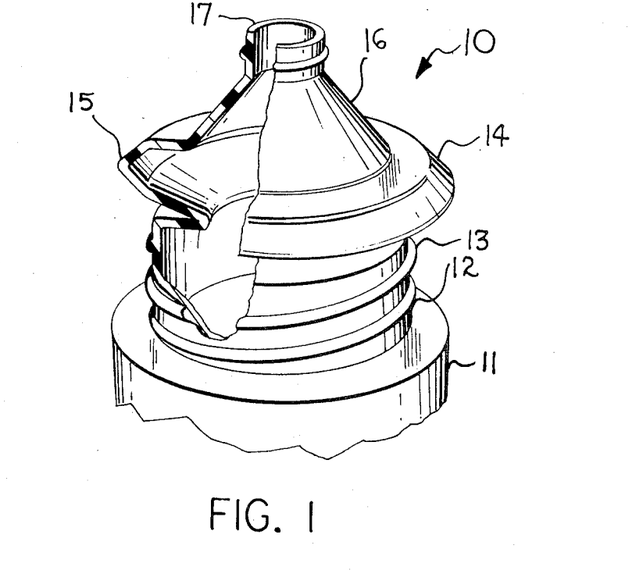
FIG. 1 shows a perspective view of an as molded container with unsevered flash material still attached.

FIG. 1 shows a perspective view of a plastic container that has been made according to the teachings of the present invention. The container generally referenced at 10 contains a body section 11 that is normally the receptacle for solid or fluid materials. A neck or finish portion 12 is attached in conventional manner to the container body section 11. Threads or other attachment means such as lugs such as shown at 13 generally circumscribe the exterior of the finish section 12.

The moile 14 or unwanted portion of container 10 is inherently attached to the uppermost end of finish 12. Moile portion 14 is the plastic material that must be removed before the container is ready for use. As shown in FIG. 1, moile 14 has a radially enlarged section 15 that is formed at the same time container 10 is created. The top 16 of moile 14 is of frusto conical configuration and terminates with a tubular piece of plastic that is of a diameter similar to the original extruded tube from which the container 10 was originally blown.

Figure 2:
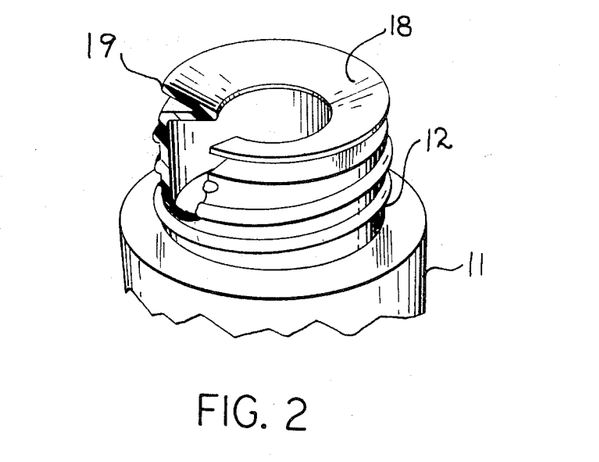
FIG. 2 is a perspective view of the same container with the flash removed.

FIG. 2 is a perspective view of container 10 with moile 14 removed. The moile 14 has been removed at its most advantageous point thus providing a pour-out spout 18 and sealing means. The moile 14 is severed circumferentially at 19. Edge 19 is of the same general diameter as the exterior of finish 12. A pour-out spout such as 18 is particularly useful in dispensing fluids such as syrup or other fluids whose use is spread across a relatively large time interval with small quantities being dispensed each time. The radially inwardly sloping surface 18 of the pour-out spout aids in the return of excess fluid into the bottle thus preventing objectionable retention of often stickey fluids on the finish area of the container.

Figure 3:
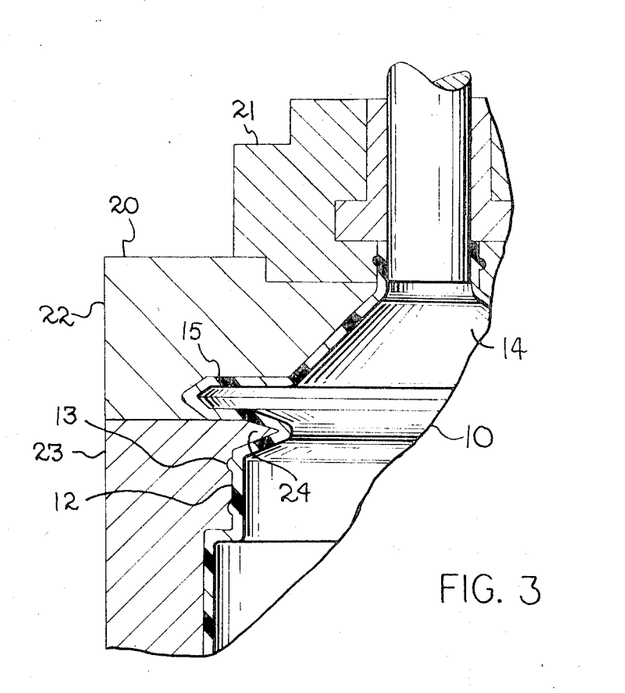
FIG. 3 is a sectional view of the container in the blow mold chamber.

FIG. 3 is a cross-sectional view taken through the blow molding dies and also the blown container. Container 10 is shown fully conformed to the interior of the especially shaped die 20. The top tube retainer section 21 grasps the tube of previously extruded plastic material and holds the tube while die 20 is positioned around the plastic tube or parison. Die 20 may be of the conventional split die configuration with each half moving into position around the plastic parison. Die 20 consists of an upper section 22 and a lower section 23. Upper section 22 defines the frusto-conical portion of moile 14 and also part of enlarged radial section 15 of moile 14. The lower section 23 of die 20 defines the lower half of radial section 15 of moile 14. The lower section 23 also forms a reentrant section 24 on the outside of container 10. The finish 12 including threads 13 are also formed by lower section 23. Thus it can be seen that container 10 is formed within the blow mold cavity with a radially protruding section 15 located just above the finish 12.

Figure 4:
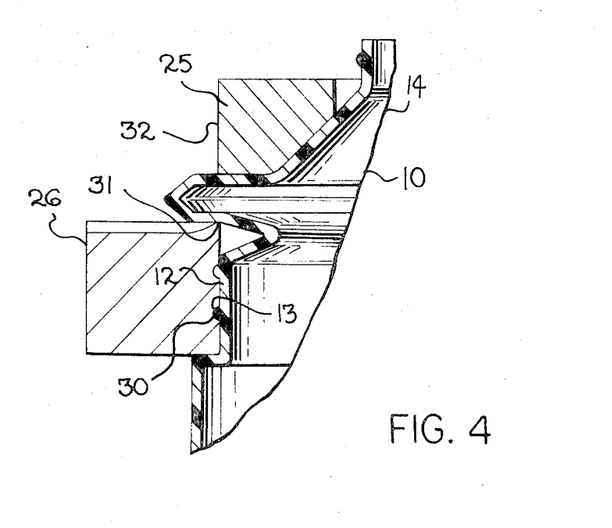
FIG. 4 is a sectional view of the container as positioned in a cutting die.

FIG. 4 is a cross-sectional view similar to FIG. 3 except that container 10 has been removed from the confinement of the blow mold and has been positioned in a support and cut-off die. A support ring 25 is positioned so that it rests against the top surface of moile 14. Support ring 25 may be of one or more pieces and can be moved into position on top of oriented container 10 or else the entire set-up can be inverted if desired so that containers 10 would be fed in an inverted position so that the moile 14 seats itself within the confinement of support ring 25. After container 10 is positioned contiguously with support ring 25, cut-off ring 26 is moved into position around the exterior of finish 12 of container 10. Cut-off ring 26 contains grooves 30 that conform generally to threads 13 on finish 12, to assure an even fit between threads 13 and grooves 30, the container is introduced to the support and cut-off die in an oriented position or else container 10 can be rotated just prior to the final seating of cut-off ring 26. While not illustrated on the drawings, the container does not have to be rotated if a thread relief is cut into the inside surface of cut-off ring 26. This modification would entail the removal of the material now presently shown between grooves 30.

The top inner edge of cut-off ring 26 contains a knife edge 31 that is in axial alignment with the outer radial surface 32 of support ring 25.

Figure 5:
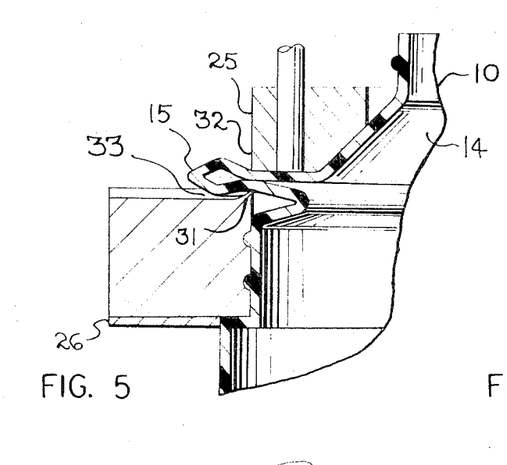
FIG. 5 is a sectional view showing the severed moile section.

FIG. 5 is a cross-sectional view showing radial section 15 just before it has been severed from container 10. The cutting action of knife edge 31 is achieved by moving rings 25 and 26 relative to one another in an axial direction. Knife edge 31 is fabricated with clearnace such as at 33 to accommodate the plastic material of the bottom half of radial section 15. The moile 14 is severed into one or two pieces by the action of knife edge 31. If support ring 25 and cut-off ring 26 are brought axially together so that only one wall thickness of container 10 remains between knife edge 31 and the lower corner of outer edge 32 then only one thickness of the radial section 15 of moile 14 will be severed.

Figure 6:
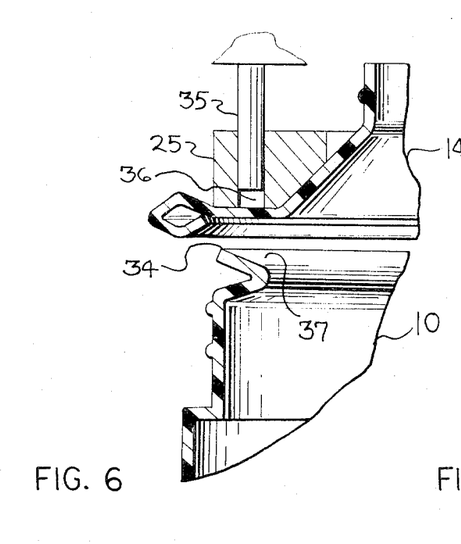
FIG. 6 is a sectional view of the container as the moile is separated therefrom.

FIG. 6 is a cross-sectional view showing container 10 just after moile 14 has been separated therefrom. Moile 14 is lifted free from the top edge 34 of container 10 by the upward movement of support ring 25. Situated within and circumferentially around support ring 25 are vacuum pistons 35 which create a vacuum chamber 36 adjacent the top surface of moile 14. When a vacuum is created in chambers such as 36, the moile 14 remains in its fixed position against the lower surface of support ring 35 thus it can be moved to a point of discharge other than the cut-off position. Pistons 35 also have an additional function in that they can be moved in a downward direction toward the top surface of moile 14 thus forcing moile 14 away from support ring 25 should for one reason or another the plastic material adhere to the surface of support ring 25. FIG. 6 also shows the top edge 34 of container 10 in an unrestrained position with an outward and upward flaired surface 37 that aids in pouring fluids from container 10 when it is in actual use.

Figure 7:
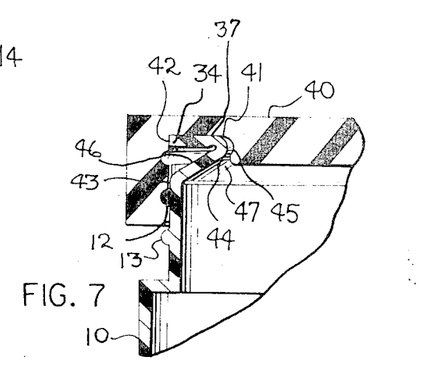
FIG. 7 is a sectional view through the container with a closure in the initial installation position.

FIG. 7 is a cross-sectional view through the container 10 of the present invention and a closure 40. An especially adapted closure 40 is shown in beginning engagement with the threads 13 of container 10. At this position closure 40 has compressed in an axially direction top edge 34 so tha flaired surface 37 rests against the interior surface 41 of closure 40. The severed edge 42 rests against the inside wall of closure 40. As closure 40 begins to grasp threads 13 of container 10, there is clearance between the inside surface of the closure and the exterior surface of finish 12. The clearance is shown at 43. There is also clearance between the throat section 44 of container 10 and reentrant section 45 of closure 40. This particular clearance is shown at 47.

As closure 40 is advanced further along the threads 13 of finish 12, the top edge 34 folds down against the lower adjacent wall 46 of container 10.

Figure 8:
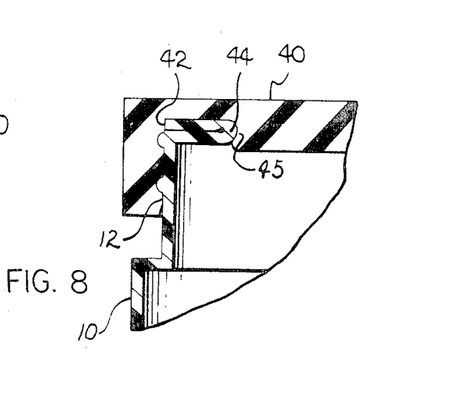
FIG. 8 is a sectional view showing the installed closure.

FIG. 8 shows closure 40 completely installed on container 10. Edge 42 continues to exert a radially outward force against the interior wall of closure 40. The throat section 44, at this point, bears tightly against reentrant section 45. Also former clearance 43 (FIG. 7) no longer exists. Thus it is evident that when closure 40 is firmly in final position upon finish 12 of container 10, an unusually effective seal results. The seal is not a one time seal since the container will conform to the configuration of FIG. 8 each time the closure is applied. Because of the unique configuration of the closure 40 and the complemental finish of container 10, the closure-container combination can withstand sudden pressure increases caused, for example, by inadvert dropping of the container while it is filled with liquid. Also, the just described closure-container combination would show improved performance while acting under the influence of a carbonated beverage.

Figures 9, 10:
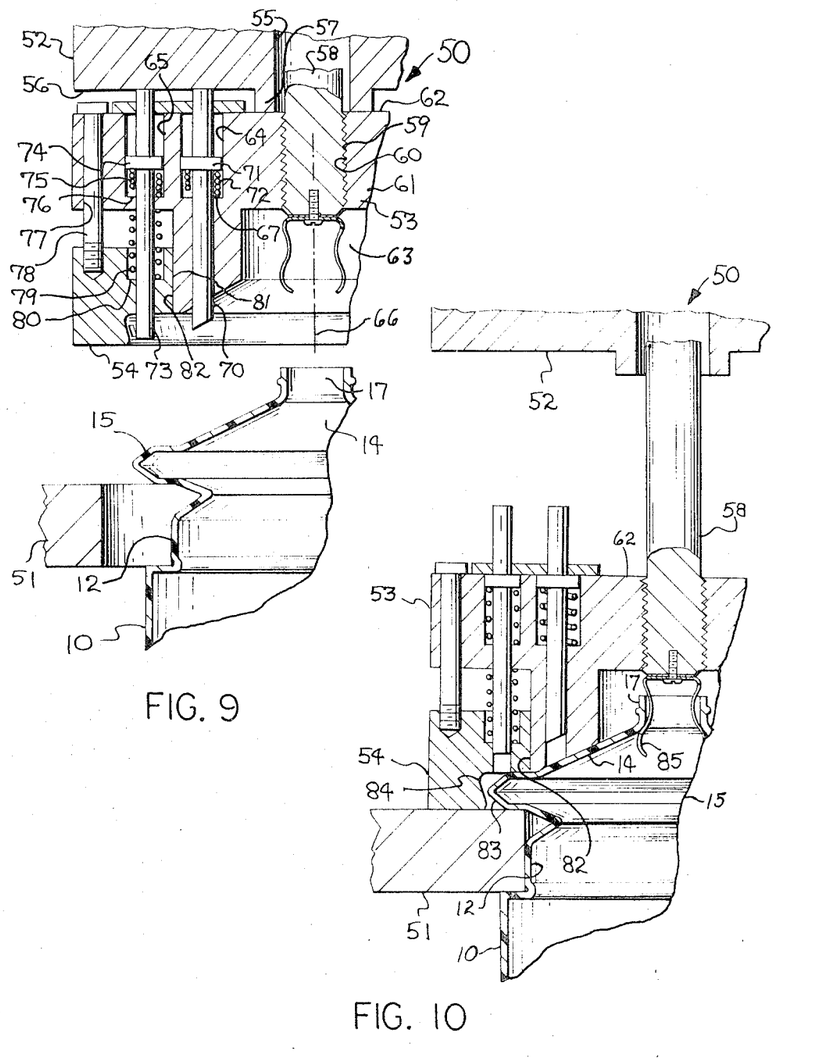
FIG. 9 is a sectional view through a flash removal die in the fully open position.
FIG. 10 is a sectional view of the flash removal die in the closed position.

FIG. 9 is a cross-sectional view through a flash removal mechanism. The flash removal mechanism is shown generally at 50. The mechanism 50 operates on a die cut principle and is somewhat similar to a punch press. Mechanism 50 is shown in FIG. 9 in the open and up position. Container 10 is fabricated by the well-known blow molding process and contains a radially enlarged section 15 positioned adjacent and attached to the finish of container 10. A multi-piece holding ring 51 is adapted to move into and out of position around the finish 12 of container 10. Holding ring 51 accurately positions container 10 in axial alignment with overall mechanism 50.

After container 10 has been firmly grasped by holding ring 51 it is in a position to have the unwanted flash material of enlarged section 15 and moile 14 removed therefrom.

The overall mechanism 50 is comprised of three main sections. The upper section 52 is stationary and is supported from conventional support structure (not shown). Section 52 contains a centrally located aperture 55 and an essentially planar bottom surface 56. Positioned integrally with and surrounding aperture 55 is downwardly protruding ring 57.

The middle section 53 is adapted for movement and carries with it lower section 54 which will be discussed infra. Middle section 53 is supported from the lower end of shaft 58 which is threaded at 59. Threads 59 coact with similar threads in tapped hole 60 in block 61 of middle section 53. Block 61 is of annular configuration and has an essentially planar top surface 62. The bottom of block 61 has an annular cavity 63 that conforms generally to the top configuration of the enlarged section 15, moile 14, and the tubular end 17 of container 10.

Block 61 contains one or more circumferentially spaced apertures that communicate with the top and bottom surfaces of block 61. Aperture 64 is located radially inward from aperture 65. Aperture 64 is of cylindrical configuration and is aligned in a direction parallel to the overall vertical axis 66 of mechanism 50. The upper portion of aperture 64 is of enlarged diameter and terminates with a ledge 67. Aperture 65 is of construction similar to aperture 64. A shaft 70 is positioned for axial movement within aperture 64. A collar 71 is attached to the upper portion of shaft 70. A compression spring 72 is interdisposed between the bottom of collar 71 of shaft 70 and ledge 67 of aperture 64. Compression spring 72 acts to move shaft 70 in an upward direction. Likewise aperture 65 contains a shaft 73 that has affixed thereto a collar 74. A compression spring 75 is positioned between collar 74 and ledge 76 of aperture 65.

Block 61 of middle section 53 contains a series of holes 77 near the peripheral extent of the block. Aligned within holes 77 are bolts 78. Bolts 78 are threadly engaged with lower section 54. Interdisposed between block 61 and lower section 54 are compression springs 79 which are retained in counterbores 80. The radially inner surface 81 of lower section 54 is of annular configuration and is adapted to slide along a similar annular surface 82 of middle section 53.

FIG. 10 shows the overall mechanism 50 as it commences to act upon container 10. Holding ring 51 has moved radially inward against the finish 12 of container 10 thus holding container 10 in vertical alignment. Shaft 58 has moved in a downward direction thus carrying middle section 53 away from upper section 52. Middle section 53 is lowered toward container 10 and thus makes contact against the moile 14. As middle section 53 contacts moile 14, lower section 54 abuts against the top surface of holding ring 51. Continued downward movement of middle section 53 results in relative motion between sections 53 and 54 since lower section 54 is stopped by contacting holding ring 51. Lower section 54 slides along the annular surface 82 of middle section 53.

The most radial extent 83 of enlarged section 15 of container 10 fits into reentrant cutout 84 of lower section 54. Also at this particular stage of operation of overall apparatus 50 a moile holding detent 85 enters the open neck portion or tubular end 17.

Figure 11:
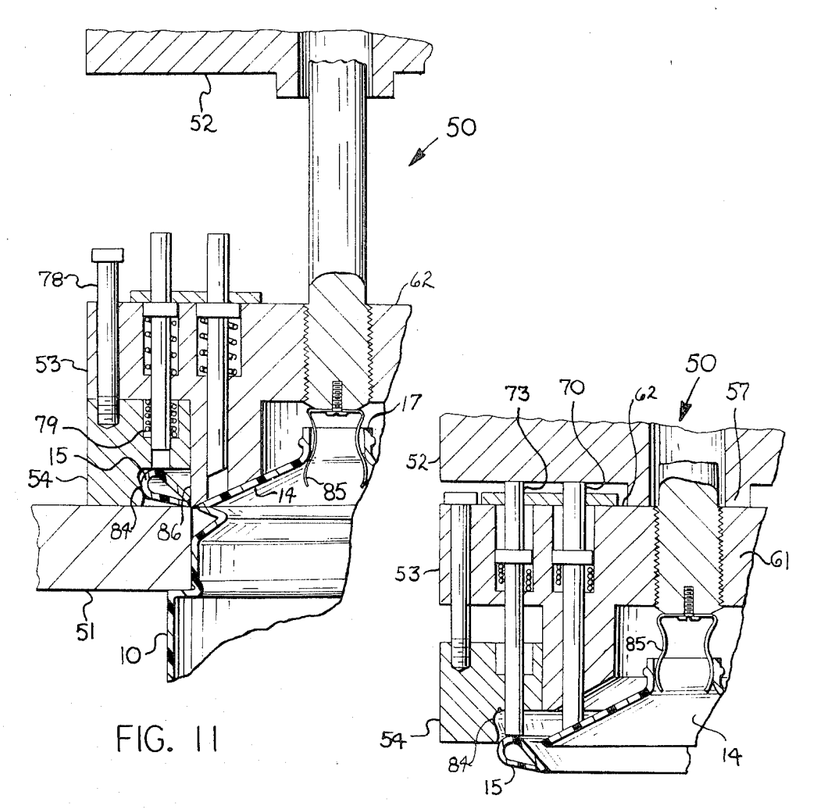
FIG. 11 is a sectional view of the flash removal die as it severs the moile.

FIG. 11 shows overall mechanism 50 with middle section 53 at the completion of its downward stroke. At this position, the cutting surface 86 has severed through both thicknesses of enlarged section 15. Section 15 is forced firmly into cut-out section 84 of lower section 54. Detent 85 is also firmly positioned within tubular end 17 of moile 14. The middle section 53 is then free to begin its upward movement. As middle section 53 moves upward, lower section 54 moves relative thereto since compressed spring 79 supplies a motivating force between sections 53 and 54.

Figure 12:
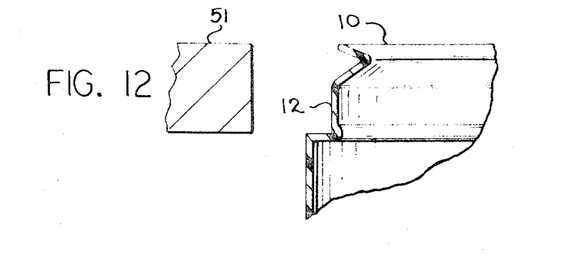
FIG. 12 is a sectional view as the cut moile is ejected from the die.

FIG. 12 shows overall apparatus 50 after middle section 53 has reached its uppermost extent with respect to lower section 54. The upper surface 62 of block 61 now rests against the bottom surface of ring 57. In this position shafts 70 and 73 are forced downward. Shaft 70 pushes upon severed moile 14 and releases it from moile holding detent 85. Likewise, the downward movement of shaft 73 disengages severed enlarged section 15 from the confinement of the cut-out recessed portion 84 of lower section 54. At this time in the sequence of operation of overall mechanism 50, holding ring 51 is moved radially outward away from the finish 12 of container 10.

Figure 13:
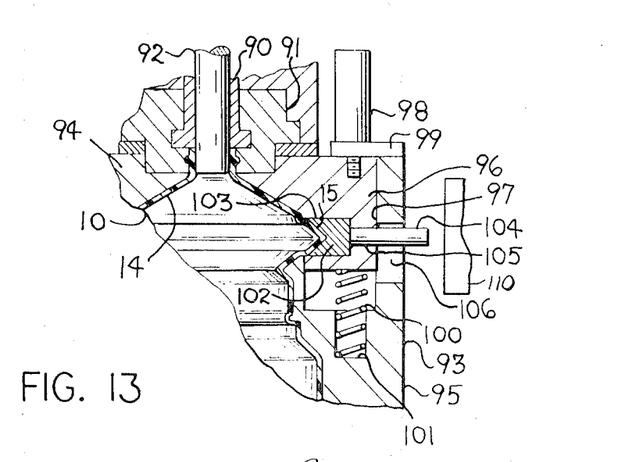
FIG. 13 is a sectional view through a blow mold equipped with an internal moile removal apparatus.

FIG. 13 represents in a cross-sectional view another embodiment of the present invention wherein the moile section is removed from a container while the container is still within the confinement of the blow mold. A retaining bushing 90 is shown at the top of FIG. 13 a split neck ring 91 is adapted to fit around the lower end of retaining bushing 90. A blow pin arrangement is shown at 92. The container 10 is formed within the cavity existing between the split mold halves 93 and 94. Container 10 is formed with a moile section 14. Interdisposed between moile section 14 and container 10 is a radially protruding section 15.

Split mold halves 93 and 94 are comprised of two main sections. For brevity only mold half 93 will be described in detail. The outer section 95 of mold half 93 contains cylindrically contoured inner wall 97. Inner section 96 is adapted for movement along inner wall 97 of mold half 93. A fluid actuated cylinder 98 is mounted by an extension mount 99 that is firmly attached to the upper extent of the outer section 95 of split mold half 93. A compression spring 100 is seated in well 101 of outer section 95. In the normal position for blowing container 10, spring 100 holds inner section 96 in an upwardly biased position.

Also shown in FIG. 13 is an ejector mechanism positioned within inner section 96. The ejector mechanism contains a notched head 102 that is contained within a bore 103 situated in inner section 96 just opposite radially enlarged section 15 of container 10. Notched head 102 is connected to a pushrod 104 that is seated in a radially extending bore 105. Push rod 104 extends radially outward through the wall of outer section 95. The hole for accommodating push rod 104 in outer section 95 is elongated so that push rod 104 can move up and down along with inner section 96. The elongated hole is shown at 106.

Figure 14:
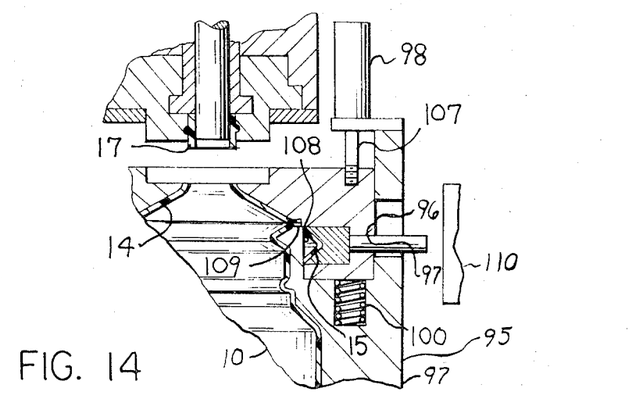
FIG. 14 is a sectional view through the die showing the moile being severed.

FIG. 14 is a cross-sectional view of the apparatus as the moile sections are severed from the container 10. Fluid actuated cylinder 98 is caused to extend its actuator rod 107 thus causing inner section 96 to move downward along cylindrical inner wall 97 of outer section 95. As inner section 96 moves to a downward position, moile 14 is broken away from tubular neck end 17. The shear surface 108 of inner section 96 contacts co-acting shear surface 109 of outer section 95 thus severing radially enlarged section 15 from moile 14 and container 10. The severed plastic material 15 is contained with the confinement of inner section 96.

Figure 15:
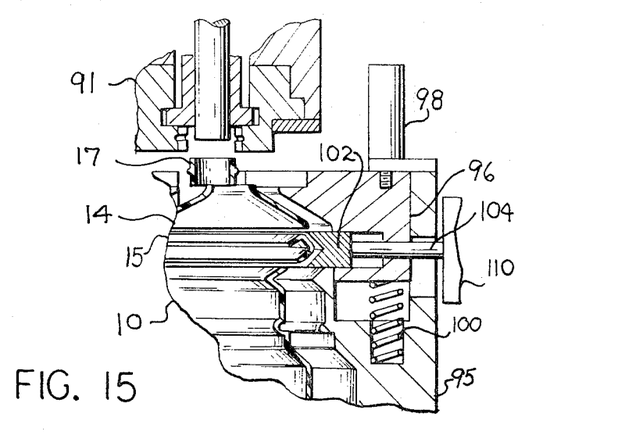
FIG. 15 is a sectional view through the die as it is opened for container and moile removal.

FIG. 15 is a cross-sectional view showing the separation of the mold halves. After inner section 96 has reached its upper position under the biasing action of compression spring 100, the mold halves are separated. Tubular neck end 17 is released from split neck ring 91. Because of its frusto-conical in configuration moile section 14 thus drops free from the parted mold halves. Radially enlarged section 15 is of annular configuration and is ejected from inner section 96 by the inward movement of notched head 102. Notched head 102 is moved inwardly by a force that is exerted on the end of push rod 104. Push rod 104 is moved under the influence of lever 110 which is moved toward the opened mold halves or the molds are moved towards stationary lever 110.

Thus in FIGS. 13, 14 and 15 it has been shown that the moile section can be removed from a container while the container remains within the confinement of the blow mold.

Figure 16:
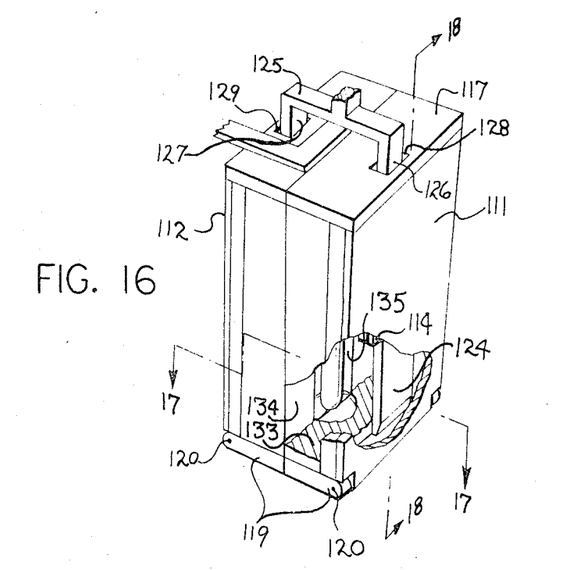
FIG. 16 is a perspective view of a pair of blow mold cavities.

An additional embodiment of the present invention is shown in the perspective view of FIG. 16. FIG. 16 shows split mold halves 111 and 112. The details of split mold halves 111 and 112 will be discussed in conjunction with the following figures which show cross-sectional views of the present apparatus.

This particular embodiment involves the production of two bottles from one freely extruded tube of plastic material. The production of in tandem bottles permits the simultaneous removal of tails and moil from both bottles. The removal of the unwanted flash material from the bottles can be achieved while the bottles are still in the mold.

The particular embodiment of the invention under discussion utilizes both vacuum and an air supply in forming the containers within the mold. Since the moil is common for both containers, its size will be reduced thus adding favorably to the size and capacity of the extruder.

Figure 17:
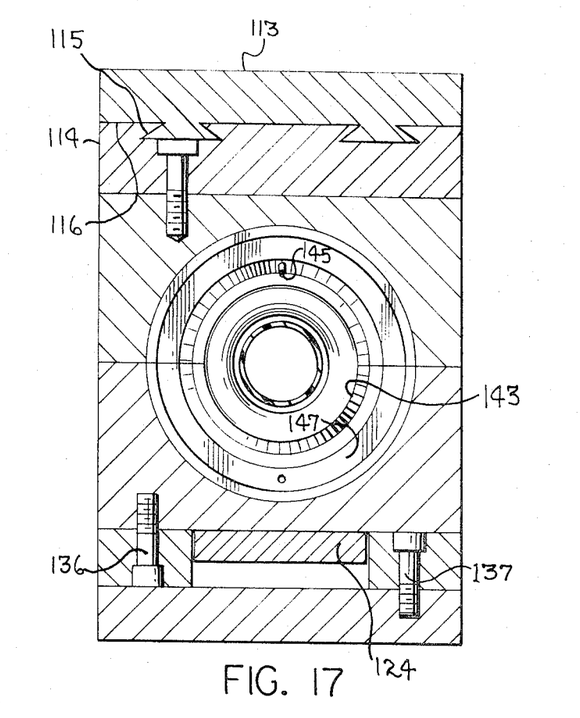
FIG. 17 is a sectional view taken along the lines 17—17 of FIG. 16.

FIG. 17 is a cross-sectional view taken through the mold halves 111 and 112 as shown in FIG. 16. FIG. 17 is a view taken along section lines 17 — 17 as shown in FIG. 16. Section 17 — 17 is at different elevations through the molds. Since mold sections 111 and 112 are very similar to each other like numerals will be used for both halves where applicable. Mold half 111 has an exterior end wall 113 that extends from the bottom of the mold to the top thereof. An intermediate slide plate 114 is positioned contiguous with end wall 113. Slide plate 114 is dove tailed to end wall 113 at 115 thus permitting slide plate 114 to move freely in a vertical direction. The dove tail arrangement 115 extends in a vertical direction for approximately the entire upper half of mold half 111. The inner face 116 of slide plate 114 is essentially planar and extends almost the entire vertical extent of mold half 111.

Figure 18:
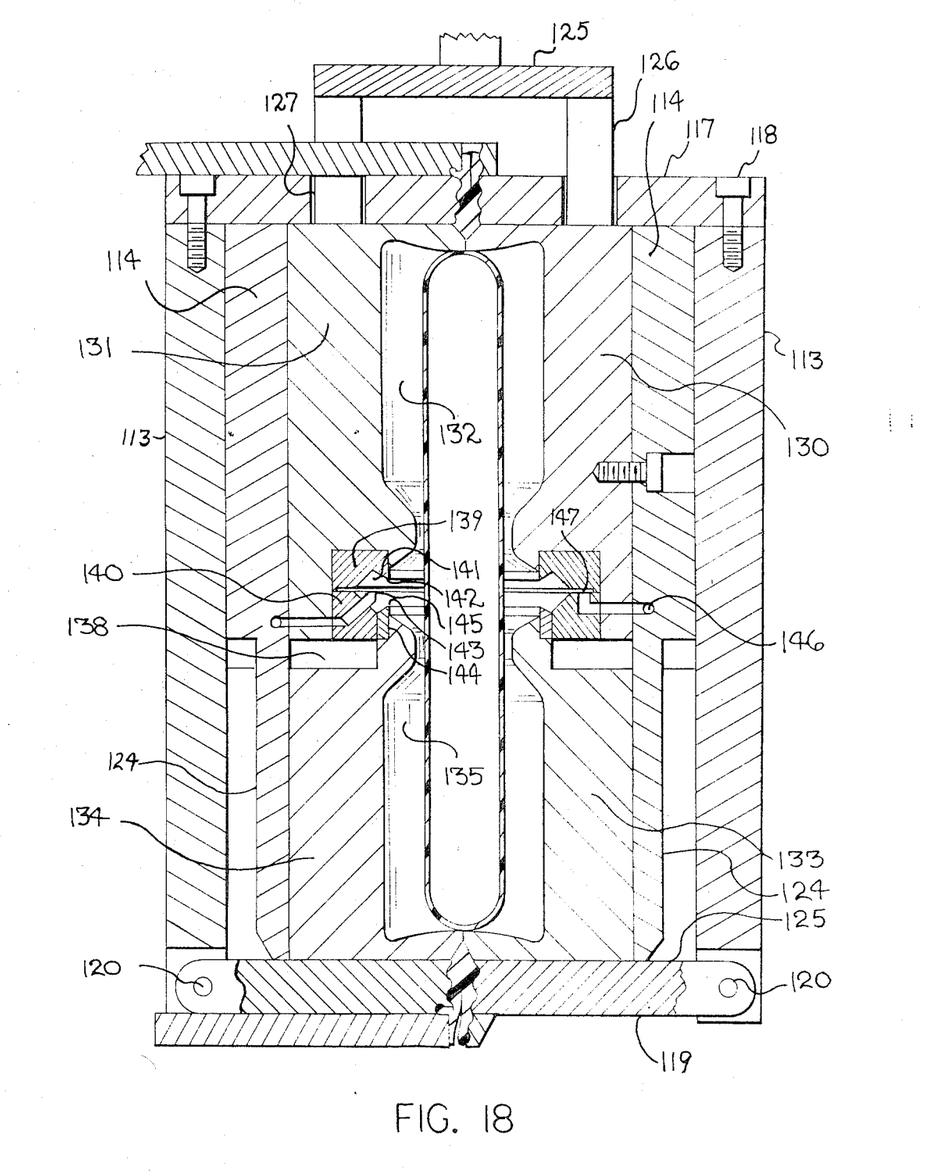
FIG. 18 is a sectional view taken along the lines 18—18 of FIG. 16 which shows a plastic parison prior to inflation.

Mold half 111 contains a top plate 117 that can be seen in FIGS. 16 and 18. Top plate 117 is attached to the top edge of end wall 113 by means of fasteners such as 118 as shown in FIG. 18. The top edge of slide plate 114 abuts the bottom surface of top plate 117. The bottom of mold half 111 is similar to the configuration at the top of the mold except that the bottom section of mold half 111 is free to move. Bottom plate 119 is hinged at 120 (FIGS. 16 and 18) to the lower extremity of end wall 113.

Referring to FIG. 18, slide plate 114, which as previously discussed, is dove tailed to the upper half of end wall 113 for freedom of movement in a vertical direction. The lower extent 124 (lower right FIG. 18) of slide plate 114 contacts the top surface 125 of bottom plate 119. Thus it becomes evident that when slide plate 114 is moved in a downward direction, bottom plate 119 will swing arcuately about hinges 120.

Returning once more to FIG. 16 a bifurcated toggle arrangement 125 is shown at the top of mold halves 111 and 112. The legs 126 and 127 of toggle 125 extend through apertures 128 and 129 in top plates 117 of mold halves 111 and 112. The ends of legs 126 and 127 bear upon the top surfaces of mold blocks 130 and 131. The toggle arrangement 125 can be moved into and out of engagement with apertures 128 and 129 by several different arrangements or it can be built into the platen of the blow molding machine.

Upper mold blocks 130 and 131 extend in a vertical direction and are attached to slide plates 114. The cavity 132 within mold blocks 130 and 131 is arranged for the production of a container in an inverted position. Since upper mold blocks 130 and 131 are rigidly attached to slide plates 114, they are free to move with whenever slide plates 114 are activated.

Lower mold blocks 133 and 134 are positioned below upper mold blocks 130 and 131. Lower blocks 133 and 134 are rigidly fastened to end walls 113. The mounting of lower mold blocks 133 and 134 is accomplished by fasteners shown at 136 and 137. Lower mold blocks 133 and 134 define a lower cavity 135 which is adapted for form a container in an upright configuration. Thus it can be seen that upper cavity 132 and lower cavity 135 define an open chamber for the in tandem creation of two blow molded containers, one in an inverted position and one in an upright position. The finishes of both containers are adjacent each other.

As shown in FIG. 18, upper mold blocks 130 and 131 are in spaced relationship with respect to lower mold blocks 133 and 134. The space is shown at 138. The lower extremity of upper mold blocks 130 and 131 contain annular inserts 139 and 140. Inserts 139 and 140 are attached to upper mold blocks 130 and 131 by conventional means. Annular inserts 139 and 140 define a radially extending cavity 141 that lies between the finish areas as defined by upper cavity 132 and lower cavity 135. The radially inward edge of annular insert 139 contains a cutting surface 142. Coacting with cutting surface 142 is knife edge 143 which is the upper extending edge of insert 144 which in turn is positioned radially inwardly of space 138. Insert 144 is attached to lower mold blocks 133 and 134.

The annular insert 140 shown in the left hand side of FIG. 18 contains an air inlet needle 145 which communicates with an externally introduced conventional air supply (not shown). The annular insert 140 as shown on the right hand side of FIG. 18 depicts a vacuum line 146 that is also connected to a vacuum source (not shown). Vacuum line 146 is connected with thin arcuate grooves 147 (FIG. 17) that provide for almost 360° vacuum distribution around the mold cavities defined by closed mold halves 111 and 112.

Figure 19:
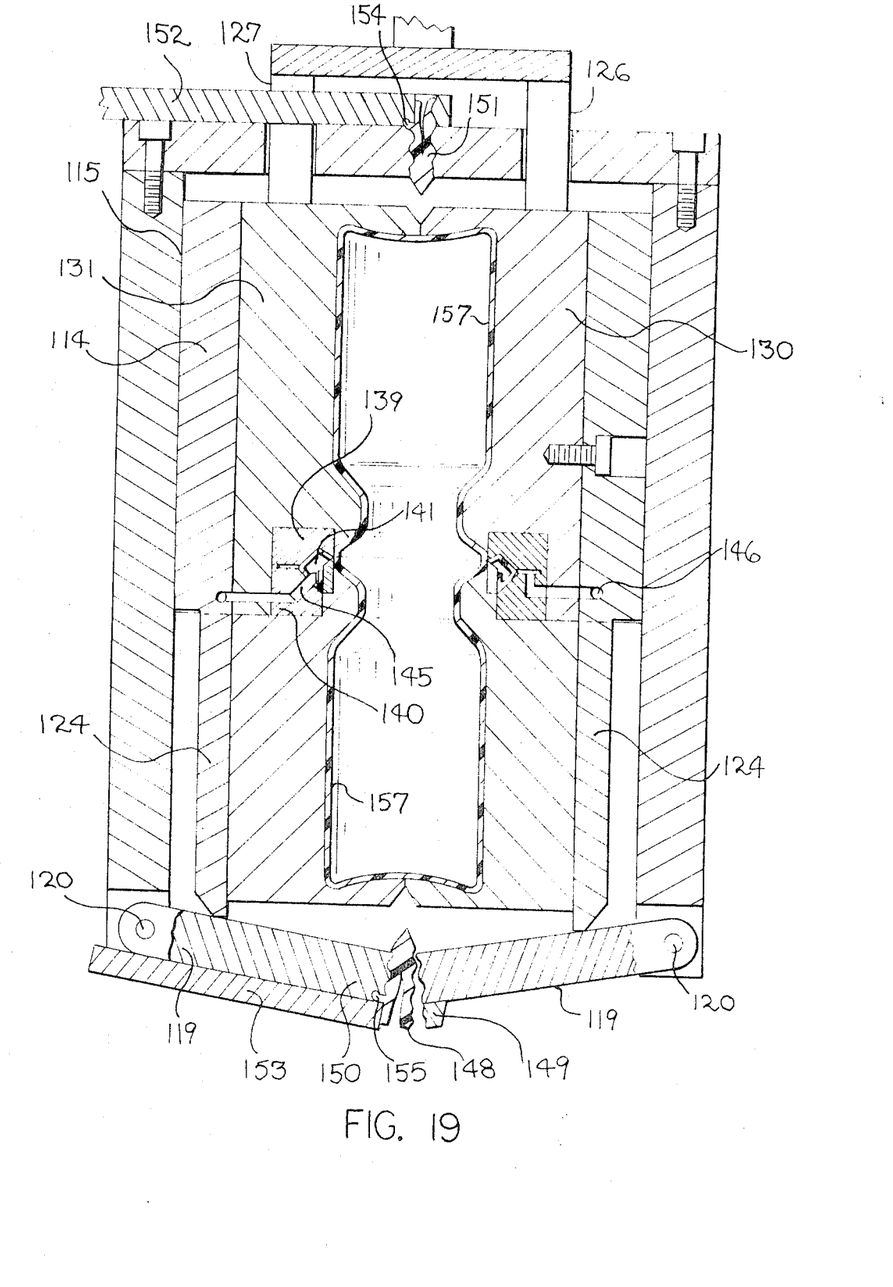
FIG. 19 is a sectional view similar to FIG. 18 which shows the tails being severed from the top and bottom of the containers as well as the common moile cut in the center.

FIG. 19 shows the present invention during the operation thereof. A predetermined length of plastic material of tubular configuration is extruded from an extruder (not shown). The length of plastic extrudate is then placed between open mold halves 111 and 112; or molds 111 and 112 are moved into position around the extrudate. Mold halves 111 and 112 are closed thus pinching off the extrudate at the top and bottom. Vacuum is then applied to the mold interior by means of vacuum line 146. The plastic material then conforms generally to the interior of the mold and particularly in the area of cavity 141 which is defined by annular inserts 139 and 140. As the plastic material is drawn into close proximity to arcuate vacuum grooves 147, the sharp protruding point of needle 145 penetrates the sidewall of the plastic tubing. The vacuum is continued and air is introduced into the interior of the plastic tubing. In a conventional manner, the introduction of air into the tubing inflates the plastic tubing so that it conforms to all sections of the mold cavity interior walls.

After the in tandem containers have been formed, toggle 125 is moved into position and a downward force is applied thus causing legs 126 and 127 of toggle 125 to bear against the top surface of upper mold blocks 130 and 131. Mold blocks 130 and 131 then moved downward as slide plates 114, to which they are attached, move along the grooves of key arrangement 115. The lower extents 124 of slide plates 114 cause mold bottom plates 119 to move arcuately around hinges 120. The tail 148 which is held between the free ends 149 and 150 of bottom plates 119 is pulled loose from the already formed plastic container 157 situated within lower mold cavity 135. In a similar manner tail 151 which is situated at the top of the molds between top plates 117 is pulled loose from the newly formed container 156 by the downward motion of the mold blocks. The tail sections 148 and 151 thus freed from the confinement of the mold blocks 130, 131, 133 and 134 are held by tail retaining bar 152 which is located at the top of the mold and bar 153 which is located at the bottom of the mold. Mold retaining bars 152 and 153 have a cut-out or re-entrant portions 154 and 155 located toward the central and inner edges thereof. Tail sections 148 and 151 are retained on the end of tail retaining bars 152 and 153 by being pressed into re-entrant portions 154 and 155. In this manner, tail sections 148 and 151 are held in position while the mold halves 111 and 112 are separated and newly formed containers 156 and 157 are released from the molds. The tail sections 148 and 151 can then be removed from the terminal ends of moile retaining bars 152 and 153.

As legs 126 and 127 of toggle assembly 125 pushes upper mold blocks 130 and 131 in a downward direction cutting surface 142 (FIG. 18) of annular insert 139 is brought down against knife edge 143 of insert 144 which in turn is held stationary by the upper extent of lower mold blocks 133 and 134. Thus the plastic material or moile that is contained within cavity 141 is sheared from newly formed containers 156 and 157. The plastic material that has been newly sheared from the in tandem containers is held within cavity 141 as upper mold blocks 130 and 131 are operated. Since the sheared plastic material within cavity 141 is of annular configuration, it will adhere to one of the mold halves as the mold is separated. The ring can then be ejected by mechanical means situated within the mold or else the ring can be pulled from the mold cavity to which it is adhered by some externally located apparatus.

The removal of the annular shaped moil section from the finish of the in tandem containers has been achieved by a cutting apparatus as described in FIG. 18. It is also conceivable and within the intent of the present invention to sever the annular moile ring from containers 156 and 157 by a blanking operation similar to that which has been described in FIGS. 13, 14 and 15.

The present invention in its various embodiments has been described in the specification set forth supra.

What is claimed is:

1. An apparatus for removing the moile section from a plastic container including a segmented ring of annular configuration that is adapted to move into and out of engagement with the external finish of a container, a cutting die positioned axially with respect to said ring, said die comprising an upper section, a middle section, and a lower section, said upper section containing an aperture located centrally therein and a bottom surface adapted to coact with selected portions of said middle section, said middle section supported from axially aligned support means situated within the aperture of said upper section, said middle section comprising an annular axially aligned surface that is in sliding engagement with said lower section, means associated with said middle section to couple it with said lower section, said middle section having an annular cutting surface that coacts with said segmented ring to shear the moile section from a plastic container.

2. An apparatus for removing the moile section from a plastic container including a segmented holding ring of annular configuration for contacting and circumscribing a container at the finish area, a multipiece cutting die positioned on an axis normally to and centrally disposed of said ring when it is in the closed position, said die comprising an upper section, a middle section and a lower section, said upper section containing an aperture coincident with said normal axis and adapted to accommodate support means for said middle section, said middle section comprising a radially extending section from which protrudes a downwardly axially extending annular portion, a lower section attached to said middle section and adapted for limited movement along the exterior surface of said downwardly extending annular portion, stop means associated with said upper section to limit the proximity of said middle section, means disposed between said middle and lower sections to bias then one from the other, shear means coupled with said middle section for coacting with said holding ring, means associated with said lower section for retaining a part of the moile section that is removed from the plastic container, ejection means associated with said middle section that coact with said upper section for the ejection of the moile sections from said middle and lower sections.

3. In an apparatus for removing the moile section from a plastic container including a segmented holding ring of annular configuration which has a radially inward surface adapted for conforming to the exterior of the finish of a container, said holding ring when in the closed position being oriented so that its axis which is normal to the radial extent of the ring coincides with the longitudinal axis of said container, a multipiece cutting die positioned symetrically with the normal axis of said ring when it is in the closed position, said die comprising an upper section, a middle section, and a lower section, said upper section containing an aperture extending axially therethrough, said upper section containing a radially extending lower section for coacting with selected parts of said middle section, said middle section suspended from support means aligned through the aperture that is postioned in said upper section, said upper and middle sections adapted to move with respect to each other in an axial direction, said middle section extending generally in a radial direction normal to the direction of its longitudinal axis, said middle section having an annular ring extending in an axial direction from the lower surface thereof, said ring containing an axially extending annular surface on the most radially remote section thereof, the lower extent of said annular surface adapted as a shear edge, said middle section containing attached thereto a lower section adapted for limited movement along its annular surface, said lower section containing a reentrant radially extending cavity on the lower surface thereof, means disposed between said middle and lower sections to bias them one from the other, means associated with said middle section for ejecting portions of the moile that has been severed from the container, said ejection means activated by contacting the lower section of said upper section.

4. In an apparatus for removing the moile section from a plastic blow molded container the improvement including a segmented holding ring of annular configuration which has a radially inward surface that conforms to the exterior of the finish of the container, the radially inner and upwardly oriented edge of said holding ring forming a cutting surface, said holding ring when in the closed position being oriented so that its central axis, which is normal to the radial extent of the holding ring, coincides with the longitudinal axis of said container, a multipiece cutting die positioned above said holding ring and in axial alignment therewith when said holding ring is in the closed position, said die comprising an upper section, a middle section and a lower section, said upper section containing an aperture extending axially therethrough, said upper section containing a radially extending lower section for coacting with selected parts of said middle section, means associated with said upper section to abut said middle section when said upper and middle sections are in contacting relationship with one another, said middle section suspended from support means aligned through the centrally positioned aperture in said upper section, said upper and middle sections adapted to move with respect to each other in an axial direction, said middle section extending generally in a radial direction normal to the direction of its longitudinal axis, said middle section having an annular ring extending in an axial direction downwardly and away from said top section, said ring containing an axially extending annular surface on the most radially extending section thereof, the lower extent of said annular surface adapted as a shear edge for coacting with the cutting surface of said holding ring, said middle section containing attached thereto a lower section adapted for limited movement along its annular surface, said lower section containing a reentrant radially outwardly extending cavity on the lower radially inward corner thereof, means disposed between said middle and lower sections to bias them one from the other, means attached to said middle section and activated for axial movement by contacting the lower surface of said upper section for ejecting portions of the moile that have been severed from the container by the shearing action of said middle section and said holding ring.

5. An apparatus as claimed in claim 4 wherein moile holding means is attached to the middle section and extends downwardly in an axially direction.

* * * * *